(12) United States Patent
Knoch et al.

(10) Patent No.: US 6,588,695 B1
(45) Date of Patent: Jul. 8, 2003

(54) METHOD AND DEVICE FOR UNWINDING ELONGATED STOCK

(75) Inventors: Horst Knoch, Coburg (DE); Frank Renner, Neustadt (DE); Swen Tischer, Neustadt (DE)

(73) Assignee: CCS Technology, Inc., Wilmington, DE (US)

(*) Notice: Subject to any disclaimer, the term of this patent is extended or adjusted under 35 U.S.C. 154(b) by 0 days.

(21) Appl. No.: 09/673,393

(22) PCT Filed: Apr. 14, 1999

(86) PCT No.: PCT/DE99/01114

§ 371 (c)(1),
(2), (4) Date: Nov. 30, 2000

(87) PCT Pub. No.: WO99/52807

PCT Pub. Date: Oct. 21, 1999

(30) Foreign Application Priority Data

Apr. 14, 1998 (DE) .......................... 198 16 444

(51) Int. Cl.⁷ .......................... B65H 77/00; B65H 23/18
(52) U.S. Cl. .............. 242/418.1; 242/420.3; 242/420.6; 242/421.7
(58) Field of Search .......................... 242/418.1, 420.3, 242/420.6, 421.7

(56) References Cited

U.S. PATENT DOCUMENTS

| | | | |
|---|---|---|---|
| 3,810,591 A | * 5/1974 | Haven | 242/420.6 |
| 4,203,540 A | * 5/1980 | Giros | 226/118.1 |
| 4,250,130 A | 2/1981 | LaSpisa et al. | |
| 4,422,583 A | * 12/1983 | Maxner et al. | 242/418.1 |
| 4,437,619 A | 3/1984 | Cary et al. | |
| 4,500,043 A | * 2/1985 | Brown | 242/413.3 |
| 4,651,937 A | 3/1987 | Duewelhenke et al. | |
| 4,774,824 A | 10/1988 | Ritter et al. | |
| 5,007,597 A | * 4/1991 | Jones | 242/420.6 |
| 5,713,533 A | * 2/1998 | Nordlof et al. | 242/418.1 |
| 5,865,051 A | 2/1999 | Otzen et al. | |
| 6,082,657 A | * 7/2000 | Chen et al. | 242/420.6 |

FOREIGN PATENT DOCUMENTS

| | | |
|---|---|---|
| DE | 3005530 A1 | 8/1981 |
| DE | 3120721 A1 | 12/1982 |
| DE | 3525022 A1 | 1/1987 |
| DE | 3929897 A1 | 3/1991 |
| DE | 4443503 A1 | 6/1996 |
| EP | 0182981 A2 | 6/1986 |
| JP | 61114954 A * 6/1986 | ............... 226/42 X |
| JP | 02152874 A * 6/1990 | ........... 242/418.1 X |
| JP | 03216448 A * 9/1991 | ........... 242/418.1 X |

* cited by examiner

Primary Examiner—Kathy Matecki
Assistant Examiner—Minh-Chau Pham

(57) ABSTRACT

An elongate product (BA1) is transported away from its storage device (VT) in such a way that at least one loop (SL) is formed at at least one longitudinal point on its running path (AW2). Changes in the geometric shape of the loop (SL) are registered and used to control or regulate the outward transport movement of the elongate product (BA1).

19 Claims, 3 Drawing Sheets

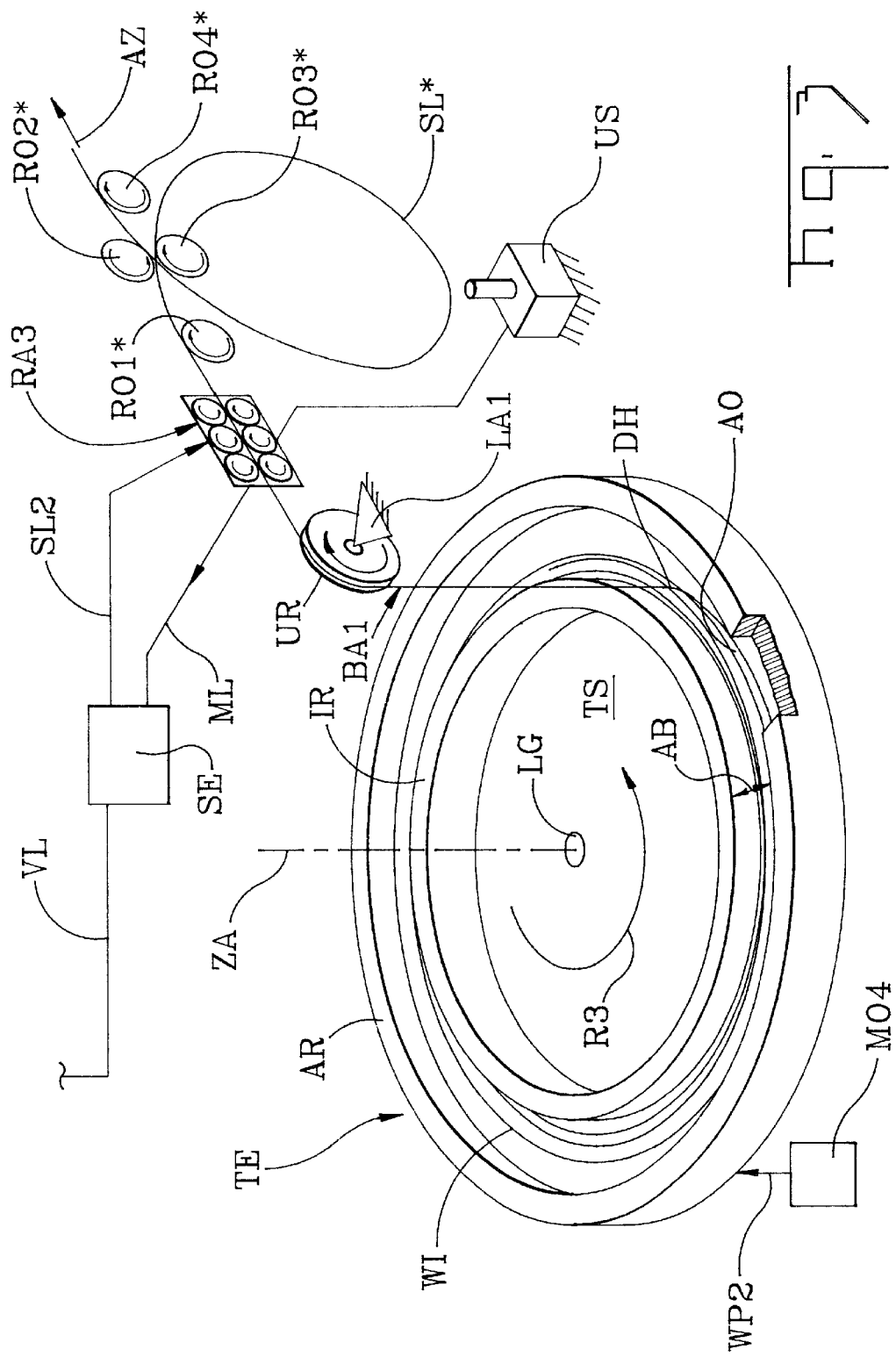

METHOD AND DEVICE FOR UNWINDING ELONGATED STOCK

FIELD OF THE INVENTION

The invention relates to a method of unwinding an elongate product from a storage device, on which the product is stored with a large number of turns.

BACKGROUND OF THE INVENTION

EP 0 182 981 discloses an apparatus in which an optical waveguide is hauled off a driven, rotating plate over a pivotably suspended lever and a following, freely rotatable deflection roller. In this case, the deflection roller is located in a plane perpendicular to the face of the plate. Its running face runs tang tangentially to the windings of the optical waveguide on the plate. At its end adjacent to the plate, the lever has an eye to guide the optical waveguide. Because of its ability to pivot parallel to the haul-off plane of the optical waveguide, it is able to follow the wandering of the optical waveguide, within certain limits, as said waveguide changes from one winding path to the next. As a result of the lever pivoting outward, a transmitter, such as a potentiometer, is actuated and influences the rotational speed of the plate in such a way that the lever returns to its central position. Satisfactory unwinding or hauling-off of the optical waveguide stored in this way from the plate for subsequent further processing steps can be made more difficult in practice. In particular, there is the danger that the optical waveguide hauled off the plate is loaded with an impermissibly high tensile stress.

BRIEF SUMMARY OF THE INVENTION

The invention is based on the object of indicating a way in which an elongate product can be unwound satisfactorily in a straightforward manner from its storage device. According to the invention, in a method of the type mentioned at the beginning, this object is achieved in that the elongate product is transported away in the axial direction from the storage device in such a way that at least one loop is formed at at least one longitudinal point on its longitudinal outward transport path, that changes in the geometric shape of the loop are registered, and that these changes are used to derive at least one control criterion for the outward transport movement of the elongate product.

The fact that at least one loop is formed for the elongate product along its longitudinal haul-off path, after it has been transported away from its storage device, and changes in the geometric shape of this loop are registered and used to derive at least one control criterion for the outward transport movement of the elongate product means that the elongate product can be unwound from its storage device satisfactorily under a large number of practical conditions.

This principle according to the invention is preferably suitable for unwinding telecommunication cable elements, in particular optical transmission elements, preferably optical waveguide cable, from supply coils or supply plates.

The invention further relates to an apparatus for unwinding an elongate product from its storage device, on which the product is stored with a large number of turns, which is characterized in that outward transport means for transporting the elongate product away from its storage device in the axial direction are provided in such a way that at least one loop of the product can be formed at at least one longitudinal point in its longitudinal outward transport path, in that a measuring device for registering changes in the geometric shape of the loop is provided, and in that this measuring device is assigned a control device which uses these changes to derive at least one control criterion for the outward transport movement of the elongate product.

BRIEF DESCRIPTION OF THE DRAWINGS

FIG. 3 shows, schematically in perspective illustration, an exemplary embodiment of an unwinding apparatus for unwinding an elongate telecommunication cable element from a plate in accordance with the invention.

Elements with the same function and mode of action are in each case provided with the same reference symbols in FIGS. 1 to 3.

FIG. 1 shows, schematically in a perspective illustration, an unwinding apparatus AV which operates on the principle according to the invention. Its components are arranged on a largely flat baseplate BP. This baseplate BP is also shown in FIG. 1, in particular as representative of the floor of a factory hall.

DETAILED DESCRIPTION OF THE INVENTION

Figure 1:
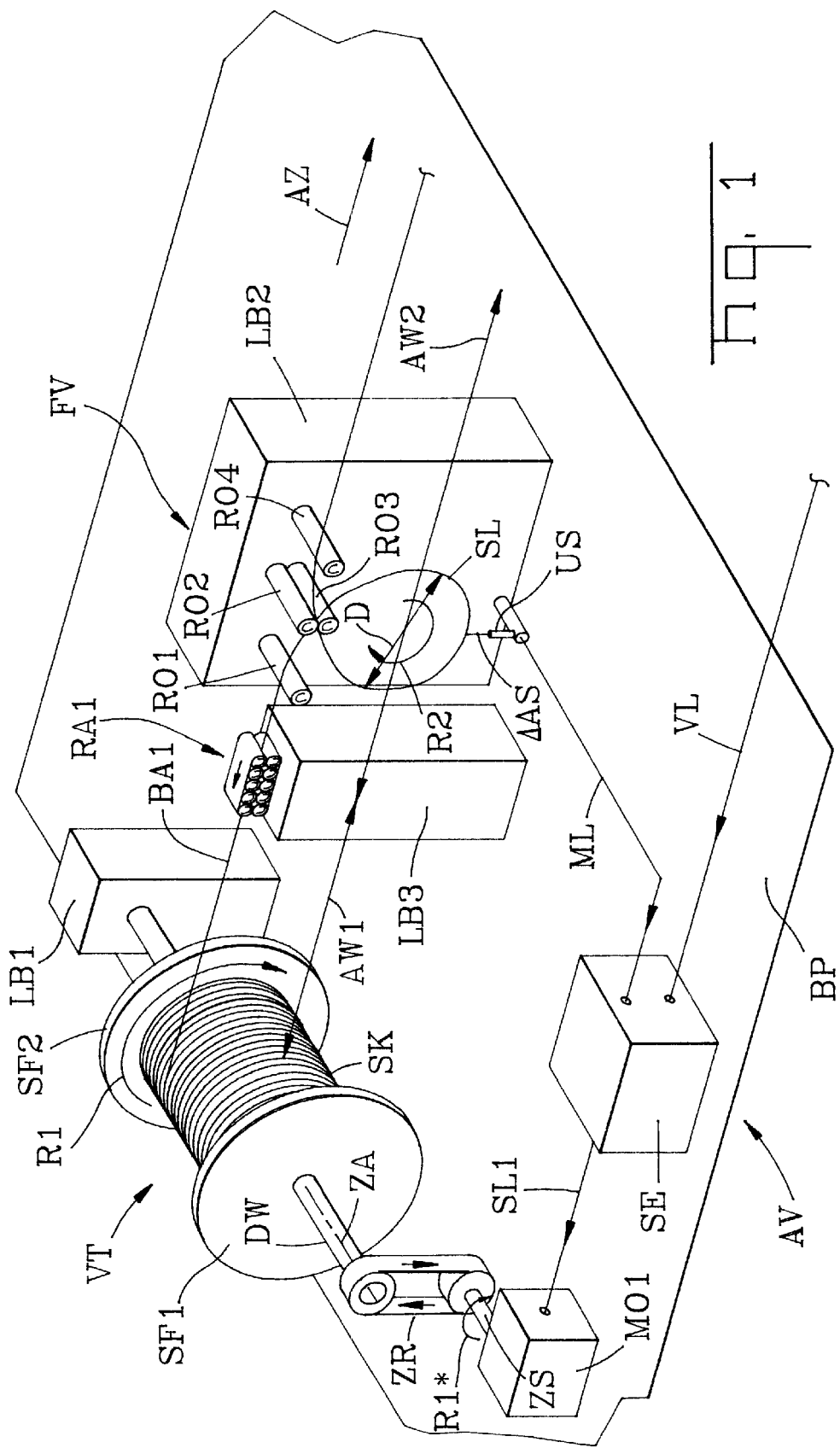
FIG. 1 shows, schematically in a perspective illustration, an exemplary embodiment of an unwinding apparatus for unwinding an elongate telecommunication cable element from a supply coil in accordance with the invention.

The unwinding apparatus AV has a supply coil or supply drum VT, on whose approximately circularly cylindrical coil former SK an optical cable BA1, in particular an optical-waveguide bundle tube, is stored as elongate product with a large number of turns. The coil former SK is in this case bounded in the axial direction (as referred to its central axis) by a circular disk-like side flange SF1, SF2 at each of its two ends. In this way, along the longitudinal extent of the coil former SK, a laterally enclosed storage area for the turns of the optical waveguide cable BA1 is formed. As a result, individual turns of the optical waveguide cable BA1 are largely prevented from falling off the coil former SK. The supply coil VT is rotatably mounted on a rotary axle or rotary shaft DW. This rotary shaft DW is preferably constructed as a circularly cylindrical rod. It extends essentially parallel to the flat baseplate BP. At one end, the rotary shaft DW is rotatably mounted in a bearing block LB1. Its other end projects freely outward. As a result, an empty supply coil can simply be pushed off the rotary shaft DW in order to be changed, and a new full coil can be pushed onto said shaft. In order to unwind the optical waveguide cable BA1, the supply spool VT is preferably firmly seated on the rotary shaft DW. It can, in particular, be releasably locked on the rotary shaft DW in both the axial and the circumferential direction.

For the purpose of driving the supply coil VT in rotation, the rotary shaft DW is operatively connected to a drive device MO1, in particular a motor. In this case, in FIG. 1 the rotational movement of the supply coil VT effected by the motor is indicated by a rotation arrow R1. The drive device MO1 has, in FIG. 1, a rotating drive shaft ZS, in particular a toothed-belt pulley. Its direction of rotation is indicated by a rotation arrow R1*. The drive shaft ZW extends essentially parallel to the rotary shaft DW of the supply coil VT. It is in particular associated with the free end of the rotary shaft DW. In the area of the free end of the rotationally driven drive shaft ZS and of the rotary shaft DW, a toothed belt ZR runs around endlessly. This toothed belt ZR is seated on a partial circumference of the rotary shaft DW, and is firmly tensioned over a partial circumference of the drive shaft ZS.

The drive device MO1 is driven by a control device SE via a control line SL1. In particular, this permits the setting of the rotational speed and/or torque which is exerted by the drive device MO1 on the supply coil VT in a desired manner by the control device SE.

With the aid of the drive device MO1, it is expediently possible not only to exert a driving effect but, in addition, or independently of this, also a braking effect on the supply coil VT.

The optical waveguide cable BA1 is stored with a large number of approximately circularly annular turns on the outer surface of the circularly cylindrical storage element SK. Along the longitudinal extent of the storage element SK, these turns in each winding layer are to a first approximation arranged parallel and beside one another. In this way, an essentially circularly cylindrical winding pack of the optical waveguide cable BA1 is kept as a supply on the supply coil VT.

From this rotationally driven winding pack, the optical waveguide cable BA1 is hauled off or transported away along its axial longitudinal extent with the aid of a downstream haul-off device RA1, in particular a caterpillar-belt haul-off. The longitudinal outward transport movement of the bundle tube BA1 is indicated by an arrow AZ in FIG. 1. In FIG. 1, the longitudinal haul-off path AW1 of the optical waveguide cable BA1 runs, by way of example and to a first approximation, linearly and in a plane which is preferably located essentially parallel to the baseplate BP. For this purpose, the optical waveguide cable BA1 is hauled off approximately at the 12 o'clock position, that is to say from the upper side of the winding pack, and is fed to the haul-off device RA1 at an approximately constant height above the floor BP. The haul-off device RA1 is permanently fitted in an elevated manner to a frame LB3. During the unwinding operation of the optical waveguide cable, a constant torque is preferably set for said haul-off device. It is used as an auxiliary haul-off to haul off the cable from the supply coil VT under tension.

As viewed in the haul-off direction AZ, the optical waveguide cable BA1 downstream of the haul-off device RA1 is paid out from its original longitudinal haul-off path AW1, here in the exemplary embodiment extending rectilinearly, with the aid of a following guide device FV, to form a single loop SL. For this purpose, the guide device FV has a number of preferably rotatably mounted deflection rollers RO1 to RO4 on a frame or bearing block LB2. These deflection rollers RO1 to RO4 are preferably designed to be essentially circularly cylindrical. They each extend transversely, that is to say laterally, in particular perpendicularly, to the axial haul-off path AW1 of the optical waveguide cable BA1. The optical waveguide cable BA1 coming from the haul-off device RA1 is initially led over the first deflection roller RO1 on the input side of the guide device FV and then led through between a pair of rollers RO2/RO3 and, in the process, deflected from its original, axial haul-off path AW1. The pair of rollers RO2/RO3 is formed by two circularly cylindrical deflection rollers which are fitted parallel and one above another. The intermediate spacing from each other is expediently selected to be approximately equal to the external diameter of the optical waveguide cable BA1, so that, in the lateral direction as referred to its axial haul-off path, said cable is guided and fixed in position to a certain extent. From this pair of rollers RO2/RO3 (as referred to the horizontal, flat floor BP), the cable BA1 hangs down so as to be freely mobile in the vertical direction. It is bent around through approximately 360° from its original outward transport direction (downstream of the haul-off device RA1) and led through between the two guide rollers RO2/RO3 again, in order then, downstream of the loop SL, to follow a new, axial outward transport path or running path AW2. In this case, the lower guide roller RO3 acts in the manner of a transverse beam on which the cable BA1 rests. It hangs down from this transverse beam as a result of its own weight so as to be freely mobile essentially in the form of a circular ring. The cable BA1 is therefore paid out in the form of a loop or sling, which is suspended on the lower deflection roller RO3 such that it hangs down freely. From the pair of deflection rollers RO2/RO3, the optical waveguide cable BA1 is fed to the deflection roller RO4 on the output side and laid on the latter at the top. The cable BA1, starting from this deflection roller RO4, is then fed along the axial longitudinal outward transport path AW2, which here in the exemplary embodiment likewise runs essentially rectilinearly, to at least one following further processing device. The latter has been left out of FIG. 1 to ensure clarity of the drawing.

If necessary, it may even be sufficient to provide only one single deflection roller, such as RO3, for the vertical suspension of the loop SL. In particular, it may be expedient to provide only the deflection rollers RO1, RO4 or only the pair of rollers RO2/RO3. In particular, it may also be sufficient to fit the respective deflection roller to the frame LB2 such that it is stationary, that is to say not rotatably mounted.

In addition, it may possibly be expedient to pay out the respective loop of the optical waveguide cable BA1 not vertically but essentially horizontally (as referred to the floor BP), for example on a flat plate, where the geometric shape of the loop can be established so as to be freely mobile. It is then possible for the deflection rollers advantageously to be dispensed with entirely.

Considered in summary, therefore, the optical waveguide cable BA1 is transported away from its supply coil VT in such a way that at least one freely mobile loop SL is formed at at least one longitudinal point on its axial longitudinal outward transport path. In particular, it may also be expedient to pay out a number of loops approximately parallel and beside one another in the lateral direction, as viewed with reference to the longitudinal outward transportpt path. In particular, loop of the cable can also be provided at a number of successive longitudinal points on the axial cable outward transport path.

The loop SL is advantageously paid out with approximately the same direction of curvature with which the optical waveguide cable BA1 was wound on the supply coil VT. The direction of curvature of the loop SL is indicated in FIG. 1 by a rotation arrow R2. This rotation arrow R2 runs in the same direction of rotation as the rotation arrow R1 for the rotationally driven supply coil VT. If, for example, the cable BA1 was wound onto the supply coil VT with turns in the clockwise direction, that is to say with right-hand turns, then it is expediently also bent around in the clockwise direction, out of its original, axial haul-off path AW1, to form the loop SL. As a result, alternating bending of the cable BA1 is largely avoided.

The cable BA1 is therefore not bent counter to its original winding curvature when paying out the loop, which in practice would possibly require the use of impermissibly high bending forces and could lead to impermissibly high stressing of the optical waveguide cable. By maintaining the direction of curvature of the cable, with which the latter was wound onto its supply coil, the cable BA1 is laid virtually automatically to form the loop SL. This is because, during its storage on the supply coil VT, the cable BA1 often has a specific bending direction impressed on it as a result of plastic material deformation. This winding direction manifests itself in particular primarily when the cable is wound onto the supply coil immediately after the production process, with the outer plastic sheath still heated. The plastic material of the wire sheath, which has not yet quite cooled down and solidified and can therefore still be deformed within certain limits, can have a curvature applied to it in or counter to the clockwise direction, depending on the winding direction. By laying the loop SL in this original winding direction, this can largely be paid out with a low bending force.

This manner of laying the loop is therefore advantageously always universally possible for a large number of elongate products having different material characteristics, cross-sectional dimensions and constructions. If the same direction of curvature is selected for the loop as that with which the respective elongate product was wound onto its storage device, said product can be paid out to form a loop even in the event of a still high inherent material stiffness. In addition, very thick or very thin wound products can always be laid in a simple and unique manner to form such a loop with a circularly annular cross-sectional shape. Expressed in general terms, therefore, such a loop can always be paid out with a unique geometric shape and, with the aid of said loop, the outward transport movement of the product can always be controlled or regulated in a precisely controllable manner.

If necessary, it may be expedient to select the external diameter of the circularly annular loop SL to be, to a first approximation, approximately the winding diameter of the turns of the cable BA1. As a result, additional bending forces for rebending the cable counter to its previously impressed winding direction when laying the loop are even better avoided.

In this way, the external diameter D of the circularly annular loop SL is primarily determined by the inherent weight of the optical waveguide cable BA1 and by the haul-off speed with which the cable BA1 is transported away along the outward transport path AW2 by the guide device FV.

This advantageously makes it possible to use changes in the geometric shape of the loop SL as a control criterion for the unwinding and/or outward transport movement of the optical cable BA1. For this purpose, changes in the geometric shape of the loop SL are registered with the aid of a measuring sensor. In FIG. 1, a non-contact measuring sensor US is fitted to the frame LB2, underneath the loop SL paid out vertically in relation to the baseplate BP, and at a distance from the loop SL. In particular, the measuring sensor US used is an ultrasonic sensor. This measuring sensor US measures distance changes ΔAS of the loop SL, and therefore, indirectly, any change in the external diameter of said loop. The measuring sensor US converts these registered distance changes ΔAS of the loop SL into electrical measured signals, and sends these via the measurement line ML to the control device SE. The control device SE then uses the measured distance changes ΔAS of the loop SL from the non-contact measuring sensor US as a control criterion for influencing the outward transport movement of the opticalcable BA1 along its axial longitudinal haul-off path AW1 and/or its outward transport path AW2. If necessary, it may also be expedient, as the control criterion, to measure the change in the external diameter of the circularly annular loop SL directly by using a suitable measuring sensor. The changes in the geometric shape of the loop SL are preferably measured continuously during the unwinding operation and provided to the control device SE for evaluation. The control device SE then uses the measurement data picked up to continuously derive at least one control criterion for regulating the outward transport movement of the cable BA1 along its haul-off path AW1 between the supply coil VT and the haul-off device RA1 and/or along the transport path AW2 which follows the haul-off device RA1. Because of the control criterion that is obtained continuously during the unwinding operation, it is therefore possible for the control device SE to control the rotational speed of the drive device MO1 continuously via the control line SL1.

The control criterion derived from the measured changes in the loop geometry is expediently used for the purpose of influencing the outward transport movement of the cable BA1 along its longitudinal outward transport path AW2 downstream of the haul-off device RA1 in such a way that a predefined diameter D of the loop SL can always be kept largely constant. This makes it possible to feed the cable BA1 to a subsequent further processing device largely with a low tensile stress, in particular with no tensile stress, that is to say loosely or relieved of stress. As a result of the freely mobile, vertically hanging loop SL, in addition any fluctuations in speed which are caused by following machines arranged downstream (of the haul-off device RA1), such as a stranding machine, can largely be compensated for by means of appropriate diameter changes. Disturbing influences of these fluctuations in speed on the unwinding operation of the cable BA1 from VT can therefore be largely avoided. In this way, high unwinding speeds of the optical cable BA1 are made possible. This is because abrupt changes in speed, which could be attributed to following processing machines of the optical cable, are decoupled by the loop SL from the unwinding operation of the rotationally driven supply coil VT and its downstream auxiliary haul-off RA1. As a result, in particular impermissibly high tensile stressing of the optical cable BA1 during its unwinding movement from the supply coil VT, or even breaks in the optical cable, are largely avoided. If, for example along the longitudinal outward transport path AW2 from the haul-off device RA1 to a following further processing machine, there is a brief increase in the speed of the cable, then the diameter D of the loop SL decreases and, as a result, compensates for the increased length of cable transported away. If, on the other hand, there is a brief drop in the speed of the cable along the outward transport path AW2, then the loop diameter D increases appropriately. As a result, along its longitudinal extent on the outward transport path AW2, the cable always remains largely under a low tensile stress.

For an outward transport movement under the lowest possible tensile stress, the optical cable BA1 is expediently predefined an external diameter D for the loop SL between 20 cm and 150 mm, which is intended always to be maintained largely by appropriate control and/or regulation of the outward transport movement of the optical cable BA1. As long as this external diameter or, expressed in general terms, the predefined geometric shape, in particular size, of the loop is largely maintained during the outward transport movement of the optical cable BA1 from the supply coil VT, it is also ensured that the cable BA1 leaves the pulling device RA1 in a largely loose state, that is to say without being subject to impermissibly high tensile forces, and can therefore be fed, largely with a low tensile stress, to following further processing devices. The haul-off force which is applied in order to transport the cable BA1 forward downstream of the haul-off device RA1 in this case essentially corresponds only to that negligible haul-off force which is determined by the inherent weight of the optical cable BA1.

The loop SL is formed in particular by a single circuit, that is to say a single turn, of the optical cable BA1. If appropriate, it can also be expedient to provide a number of such loops SL parallel, beside one another and laterally with respect to the longitudinal axis of the cable BA1. As a result, still more compensation length is provided in order to compensate for speed fluctuations in following further processing machines. If appropriate, it may also be expedient to provide such compensation loops at a number of longitudinal points located one after another on the longitudinal haul-off path of the cable BA1.

The unwinding concept according to the invention is of course suitable not only for hauling off an optical cable, such as BA1, but also for the outward transport of other elongate products, in particular telecommunication cable elements, from storage devices. Thus, in practice, for example, optical transmission elements, such as optical waveguide ribbons, solid optical waveguide cables, and so on are kept in store on supply coils or horizontally mounted plates, and can then be hauled off or uncoiled from these for further processing. In the same way, it may be expedient to use the unwinding concept according to the invention for unwinding electrical telecommunication cable elements, such as electrical conductors or the like.

Figure 2:
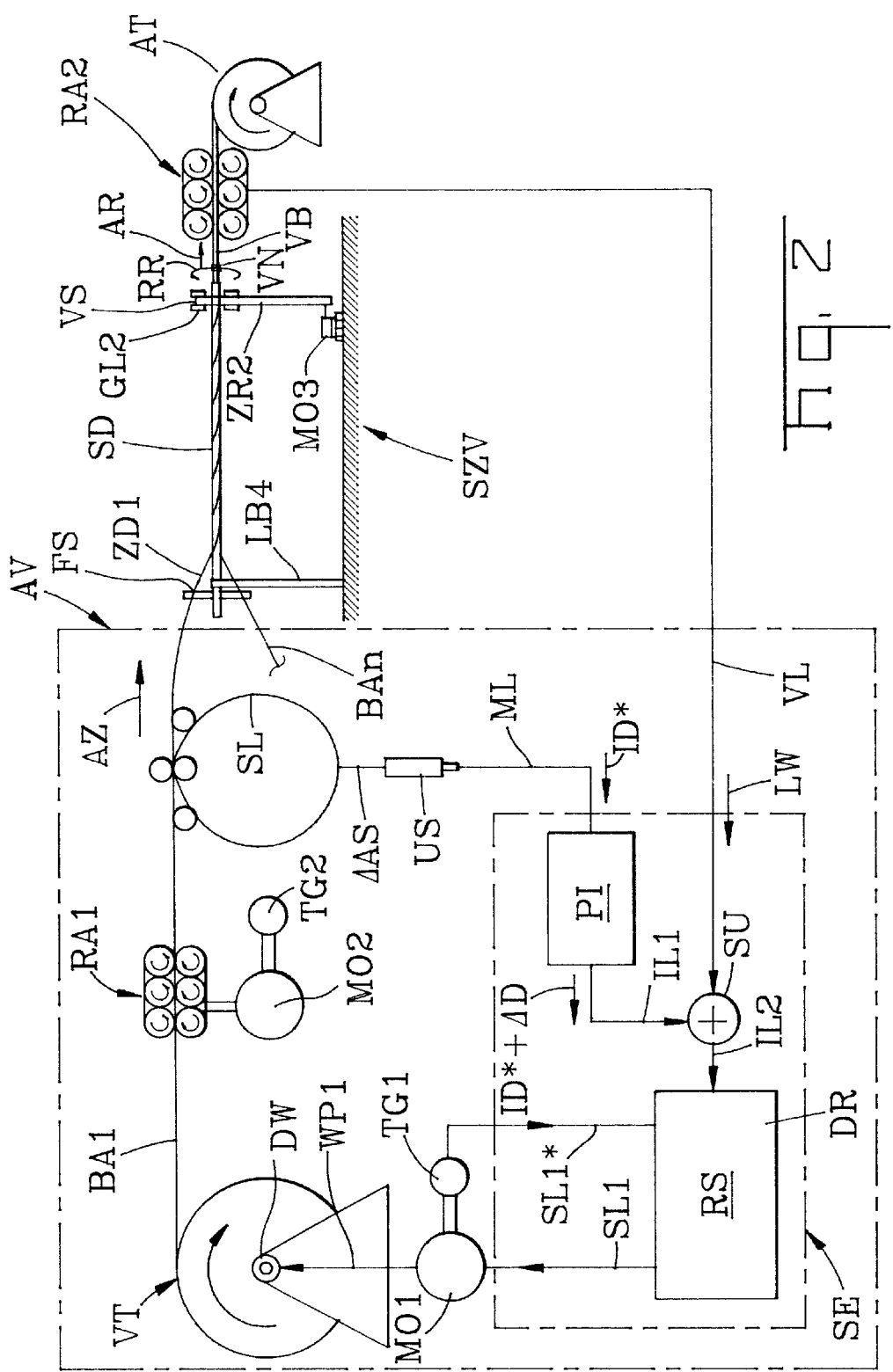
FIG. 2 shows, in a schematic side view, the unwinding apparatus of FIG. 1 together with a downstream stranding device, to which the unwound telecommunication cable element is fed.

FIG. 2 shows a schematic longitudinal depiction of the unwinding apparatus AV of FIG. 1 with the associated control scheme, as well as a stranding device SZV which is arranged downstream and to which the unwound, elongate cable BA1 is fed. The control device SE has a speed controller DR which is connected via the control line SL1 to the drive device MO1 for the supply coil VT. The drive device MO1 is assigned a so-called tachogenerator TG1, which supplies the actual speed value currently reached to the speed controller DR via a feedback line SL1*. The speed controller DR then compares this actual speed with a desired reference speed value RS which is to be set, and continuously regulates the drive device MO1 to this reference speed value. The fact that the drive device MO1 is operatively connected to the rotary shaft DW of the supply coil VT is indicated in FIG. 2 by an action arrow WP1.

As distinct from the speed regulation of the drive device MO1, a motor MO2 with associated tachogenerator TG2 is provided for the haul-off device RA1, for which motor a constant torque is set. As a result, the haul-off device RA1 always exerts on the cable BA1 a tensile force such that the cable BA1 always remains tensioned tautly on its running path AW1 between the supply coil VT and the haul-off device RA1. Regulation of the motor MO2 by the control device SE is not required in this case.

Using the measuring sensor US, changes in the direction ΔAS of the loop SL with respect to the measuring sensor US are measured and used as a measure of the change in the diameter of the loop SL. Here, the measuring sensor US is connected to the control device SE via the measuring line ML. The measured signals ID* generated by the measuring sensor US are fed via the measuring line ML to a controller PI, in particular a so-called proportional-integral controller.

This controller PI compares the actual measured value ID* for the loop diameter which is picked up in each case with the predefined reference loop diameter value D and, if necessary, generates a control signal ΔD, in order to be able to keep constant this desired reference value D for the loop diameter by means of appropriate regulation of the rotational speed of the supply coil VT. For this purpose, the controller PI transmits the appropriately corrected actuating signal ID*+ΔD via a line IL1 to an adder SU. As a further input variable, this adder SU is fed via a connecting line VL with the haul-off speed signal LW of the haul-off device SZV arranged downstream. This line control value, added to the corrected actuating signal ID*+ΔD, is fed via the line IL2 to the speed regulator DR as a reference variable, which is a measure of the reference speed RS to be set.

If the haul-off speed of the cable BA1 increases because of the stranding operation of the stranding device SZV, the loop diameter decreases. In order to reach the same loop diameter D again and therefore as far as possible to have no tensile stress in the cable BA1 along its outward transport path AW2, the control device SE increases the speed of the motor MO1 and therefore of the supply coil VT in such a way that correspondingly more running length of the cable BA1 runs off the supply coil VT, and the loop accumulator SL is again filled with sufficient supply length. If, conversely, the haul-off speed of the cable decreases because of the stranding operation, the loop diameter of the loop SL increases, which in turn is registered by the measuring sensor US. The measured signals ID* from the latter are forwarded to the controller PI of the control device SE. The controller PI then produces a control variable ID*+ΔD, with the aid of which the speed controller DR is instructed to reduce the speed of the supply coil VT appropriately, so that less running length of the cable BA1 runs off the supply coil VT. As a result, the accumulator length of the loop SL is correspondingly shortened, and therefore the original loop diameter D is readjusted.

In this control concept, the haul-off device RA1 pushes the running length of the cable into the accumulator formed by the loop SL with a constant torque. It is used only for the purpose of keeping the cable BA1 taut on its running path AW1 directly downstream of the supply coil VT, so that it cannot sag there. As a result, tangling of the cable is reliably counteracted.

The controller PI can expediently be designed in such a way that it only reacts when an upper limit for the change in the loop diameter is exceeded. As a result, the loop controller does not respond to very short speed fluctuations of the cable on its running path AW2. These are therefore preferably compensated for solely by means of small, negligible changes in the diameter of the loop SL. Very rapid, abrupt, that is to say brief, changes in the speed of the cable are therefore preferably not converted into changes in the speed of the supply coil VT by the controller PI in this controller concept.

In FIG. 2, the optical cable BA1, after passing through the loop accumulator, formed here by the single loop SL, is fed to the stranding device SZV. This stranding device SZV is constructed in particular as an SZ stranding machine. It has an elongate, rectilinear storage element SD, in particular a cylindrical tube, which is set rotating in opposite directions (SZ stranding). As a result, the respective stranding element is wrapped around the outer circumference, that is to say on the smooth surface of the rectilinear storage element SD. The storage element SD is rotatably mounted in a stationary feed device FS. Of course, further bearings—not specifically illustrated here—can also be provided. For reasons of simplicity, only the optical cable BA1 is illustrated along the course of the storage element SD. Of course, the same type of wrapping applies to the other stranding elements, that is to say further optical cables BA2 to BAn, which are fed to the stranding device SZV in a manner corresponding to the optical cable BA1 by unwinding devices of similar construction. At the right-hand end, the output side, of the storage element SD, a stranding disk VS is provided, and is firmly seated there on the storage element SD. At the left-hand end, storage element IS SD is supported by a bearing member LB4. The stranding disk VS is driven with the aid of a motor MO3 via a toothed belt ZR2. In this way, the stranding disk VS is set rotating synchronously with the storage element SD. The stranding disk VS has a series of holes in the manner of a perforated ring GL2, in each of which the stranding elements, here optical cables BA1 to BAn, are guided individually. After leaving the storage element SD, the optical cables pass to a stranding nipple VN that rotates in a direction RR. In this stranding nipple VN, the optical cables, that is to say expressed in general terms the stranding elements, are combined into a bundle VB and, in the haul-off direction AR, may be fed to further processing equipment not illustrated here, such as a holding-spiral spinner. The stranded product produced in this way is finally gripped with the aid of a haul-off device RA2, in particular a caterpillar-belt haul-off, which effects the actual forward transport of the stranding elements over the storage element SD. The stranded product transported forward in this way is finally wound up onto a supply coil AT or a plate and kept stored there.

During the oscillating rotational movement of the storage element SD, a maximum number of wraps of the stranding elements is alternately wound around it in a helix and then filled again only with stranding elements running parallel to its longitudinal extent. As a result, the stranding elements, here the optical cables BA1 to BAn, are fed with different haul-off speeds to the input side of the SZ stranding device SZV. These speed fluctuations are advantageously compensated for with the aid of the loop accumulator SL according to the invention. In particular, the loop accumulator SL can enable decoupling to be achieved between the unwinding operation from the storage device, such as VT, of the respective stranding element, such as BA1, and the stranding operation of the latter.

By means of continuous monitoring and evaluation of the loop geometry during the unwinding operation, it is therefore possible to derive a control criterion for controlling or regulating the outward transport speed of the cable on its running path AW2. For this purpose, the control device SE, in addition to or irrespective of regulating the rotational speed of the supply coil VT via the control line SL1, may, if appropriate, also activate the haul-off device RA2 on the output side of the following stranding device SZV via a corresponding, further control line (which, for reasons of clarity, has been left out of FIG. 2 here).

In addition to or irrespective of the regulation of the speed of the storage device for the respective telecommunication cable element, it may possibly also be expedient to regulate the speed of the haul-off device RA1 which is arranged downstream of the storage device VT. This is particularly advantageous if a storage plate is used for the storage device VT. In this case, a constant torque is expediently set for the plate.

FIG. 3 shows, in schematic form, a perspective illustration of a plate TE of this type as a storage device for the optical cable BA1. The plate TE is constructed like a circular disk. With the aid of a bearing LG at its center, it is suspended such that it can rotate in a direction R3, about the axis of rotation ZA which is illustrated dash-dotted and which runs through its center, as a surface normal, essentially perpendicular to its bearing plane. The plate TE is physically suspended in such a way that its storage area forms essentially a horizontal storage plane TS for the optical waveguide cable BA1. The individual turns or loops of the optical waveguide cable BA1 are laid down in the form of a torus-like arrangement on the top of the plate TE as a winding pack, that is to say the optical waveguide cable BA1 is stored in a torus-like storage area of the plate TE with the aid of a large number of approximately circular turns. The torus-like storage area AB for the optical waveguide cable BA1 is bounded on the outside by an outer, circularly annular plate rim AR. This outer plate rim projects upward at right angles to the horizontal bearing plane TS of the plate TE. As a result, individual turns of the optical waveguide cable BA1 can be prevented from falling off the plate TE.

In a manner corresponding to this, the storage area AB is bounded radially inward by an inner, circularly annular plate rim IR, which likewise projects upward at right angles to the storage plane. In this way, the laterally enclosed, ring-like or torus-like storage area AB is formed between the inner and outer plate rims IR, AR.

In order to unwind the cable BA1 from the plate TE, the cable BA1 is taken out of the plate TE so as to be freely mobile and loose, in such a way that a sag DH is established for it. For this purpose, in FIG. 3, the cable is lifted off the winding pack at the circumferential location AO and led out upward to a physically remote guide device which is placed higher, in particular a deflection roller UR. The deflection roller UR is roatably mounted in a bearing LA1. As a result of the inherent weight of the cable BA1, a specific sag DH is automatically established for said cable between its lifting location AO on the top of the plate TE and the deflection roller UR. The plate TE is set rotating with the aid of a drive device MO4, in particular a motor. This is indicated with the aid of an action arrow WP2. In this case, a largely constant torque or a fixed rotational speed, in particular, is set for the motor MO4. In order to haul the cable out of the plate TE, a haul-off device RA3, in particular a belt haul-off or a caterpillar-belt haul-off is arranged downstream of the rotatably mounted deflection roller UR.

Downstream of the haul-off device RA3, the cable BA1 is led around, with the aid of one or more deflection rollers RO1 to RO4, to form a loop SL* in a manner similar to the loop SL of FIG. 1. This loop SL* hangs down freely. It is preferably designed like a circular ring. Its direction of curvature is preferably selected to be the same as the bending direction of the cable on the plate TE. In particular, its external diameter is selected to a first approximation to be approximately equal to the diameter of the respective cable turn on the plate TE. In order to form the loop SL* with the aid of deflection rollers RO1* to RO4*, the cable, coming from its original haul-off path from the haul-off device RA3, which runs rectilinearly here, is deflected through about 360°. After passing through the loop SL*, the cable is transported forward, again essentially rectilinearly, in the haul-off transport direction AZ.

In order to be able to transport the cable BA1 forward largely with a low tensile stress along its axial longitudinal extent downstream of the haul-off device RA3, a specific loop diameter is preferably predefined. The haul-off speed of the haul-off device RA3 is then continuously adjusted during the unwinding process in such a way that the result is approximately always about the same loop diameter from the first to the last turn WI of the cable BA1 to be unwound.

For this purpose, the respectively current external diameter of the loop SL* of the cable BA1 is measured with the aid of the measuring sensor US and, as a control criterion, is transmitted via the measuring line ML to the control device SE for controlling the haul-off speed of the haul-off device RA3. The control device SE advises the haul-off device RA3 appropriately via a control line SL2. The fact that the haul-off device RA3 is controlled or regulated in such a way that, from the first to the last unwound cable turn, that is to say for all the cable turns of the winding pack, essentially the same geometric shape and loop size, in particular the same external diameter of the loop SL*, is established, means that it is possible to feed the cable downstream of the haul-off device RA3 largely with a low tensile stress to further production devices, although these have been left out of FIG. 3 here for the purpose of clarity of the drawing.

At the same time, it can also be ensured that the cable remains largely free of compression. As a result, the length ratio previously set in a defined way during the manufacturing process between the cable sheath and optical waveguide for the optical waveguide cable can also be largely maintained after said cable has been unwound from the storage device. In particular, it can largely be ensured that any excess length achieved during the manufacturing process of the respective optical waveguide with respect to the cable sheath surrounding it is not undesirably reduced or even completely eliminated by the action of unwinding the cable. As a result of the free mobility of the loop SL*, its diameter can always be set freely, that is to say unimpededly. As a result, the situation is largely avoided in which the cable is not stressed by being flexed in an impermissible way during the unwinding operation by excessively small bending radii. For the fully circularly annular loop that hangs down, it is expedient if a bending radius is maintained which corresponds to at least 30 times the cable diameter, in particular between 40 and 50 times the cable diameter. Since the circularly annular loop can be established freely and hangs down freely, and its loop geometry can be measured without contact, there is no mechanism which acts in an undesirable way on the cable during its removal from the storage device and its unwinding movement. As a result, the cable can be unwound from its storage device largely without friction. In addition, the measuring system remains largely free of wear. In addition, the measurement and control system for controlling the transport speed of the cable remains largely free of external inertia, that is to say the result is short reaction times for the measurement and control system, so that high measurement dynamics can be achieved. Since the measurement of the sag is preferably carried out without contact, the measurement is, moreover, advantageously independent of cable properties, such as cable diameter, cable weight, cable stiffness or cable surface.

As a result of measuring the loop geometry, it is at the same time advantageously made possible to detect faults in the unwinding operation of the cable as well, such as disruptive thick points or other inhomogeneities in the geometric shape of the cable. If, for example, the distance of the loop, such as SL* or SL, from the measuring sensor US becomes too large, that is to say if it exceeds an upper limiting value, it can be concluded in particular that the cable has become caught at some point on its plate or its supply coil or in a following further processing device. The production line can then advantageously be switched off immediately, if appropriate. If no distance at all between cable and measuring sensor is measured, then it can be concluded, in particular, that the cable has been unwound completely from the plate.

Within the context of the invention, the term optical waveguide cable is preferably understood to mean an optical cable in whose cable sheath either only a single optical waveguide (hollow cable) or else a large number of optical waveguides can be accommodated loosely, that is to say so as to be essentially freely mobile, or with play (bundle tube). For the cable sheath, an extruded plastic can preferably be used. The unwinding method according to the invention can be used, in a manner which is equally advantageous, for an individual optical waveguide, optical waveguide ribbon or other optical transmission elements.

In addition, the unwinding principle according to the invention is also suitable for unwinding other mechanically sensitive, in particular tensile-stress-sensitive, wound products in cable technology, such as electrical cables, winding threads, retaining spirals or the like.

In addition to the arrangements, presented in FIGS. 1 to 3, of storage device, guide device and loop accumulator, other constructions are of course also possible, provided it is ensured that at least one loop of the telecommunication cable element to be unwound can be paid out so as to be freely mobile.

The invention is above all distinguished by the fact that haul-off regulation is still possible even when an elongate product with a high inherent stiffness is to be unwound. Speed fluctuations arising from further processing machines, such as an SZ stranding machine, can advantageously be compensated for by the loop accumulator. The loop accumulator permits the unwinding movement to be decoupled from subsequent further processing processes. In particular, high unwinding speeds are made possible. The observation of the loop geometry advantageously permits rapid response of the regulating or control system for the outward transport movement of the elongate product.

What is claimed is:

1. A method of unwinding an elongate telecommunication cable element from a storage device, on which the telecommunication cable element is stored with a large number of turns, characterized in that the elongate telecommunication cable element is transported away in an axial direction from the storage device in such a way that at least one loop of about 360 degrees is formed at at least one longitudinal point on a longitudinal outward transport path of the telecommunication cable element, whereby changes in the geometric shape of the loop are registered by means of non-contact measurement, said changes in the geometric shape are used to derive at least one control criterion for an outward transport movement of the elongate telecommunication cable element.

2. The method as claimed in claim 1, wherein the loop is paid out essentially as a circular ring.

3. The method as claimed in claim 1, wherein the loop is paid out so as to be as freely mobile as possible.

4. The method as claimed in claim 1, wherein the loop is paid out with the same direction of curvature as that with which the telecommunication cable element was wound onto the storage device.

5. The method as claimed in claim 1, wherein the diameter of the loop is selected to be approximately equal to the winding diameter of the turns of the telecommunication cable element.

6. The method as claimed in claim 1, wherein the outward transport movement of the telecommunication cable element is carried out in such a way that a predefined diameter of the loop is always kept largely constant.

7. The method as claimed in claim 1, wherein the loop is paid out vertically.

8. The method as claimed in claim 1, wherein the loop is paid out horizontally.

9. The method as claimed in claim 1, wherein, as the control criterion, the change in the diameter of the loop is measured.

10. The method as claimed in claim 1, wherein, as the control criterion, the change in the distance of the loop from a non-contact measuring sensor is measured.

11. The method as claimed in claim 1, wherein the storage device is driven in rotation.

12. The method as in claim 11, wherein said rotation of said storage device comprises a speed of rotation, said speed of rotation of said storage device being controlled or regulated on the basis of the control criterion.

13. The method as claimed in claim 1, wherein the haul-off speed of the telecommunications cable element is controlled or regulated on the basis of the control criterion.

14. The method as claimed in claim 1, wherein the telecommunication cable element is transported essentially rectilinearly away from the storage device.

15. The method as claimed in claim 1, wherein, after passing through the loop, the telecommunication cable element is fed to a further processing device.

16. The method as claimed in claim 1, wherein the diameter of the loop is selected to be sufficiently large that changes in the haul-off speed of the telecommunication cable element, which are caused by at least one processing device downstream of the loop, as viewed in its outward transport direction, are largely compensated for in terms of length.

17. The method as claimed in claim 1, wherein the telecommunication cable element is pushed onto the loop with the aid of at least one auxiliary haul-off.

18. The method as claimed in claim 17, wherein the auxiliary haul-off between the storage device and the loop is operated in such a way that, downstream of the auxiliary haul-off, the telecommunication cable element is transported forward largely with a low tensile stress.

19. The method as in claim 1, wherein said telecommunication cable element comprises an optical transmission element.

* * * * *